United States Patent
Bielecki et al.

(10) Patent No.: US 6,702,138 B1
(45) Date of Patent: Mar. 9, 2004

(54) INSULATED BEVERAGE CONTAINER AND LID ASSEMBLY

(75) Inventors: Andy Bielecki, Chicago, IL (US); Brian Furlong, Westchester, IL (US); Michael Jensen, Roselle, IL (US); Tim Nowack, Chicago, IL (US)

(73) Assignee: Starbucks Corporation, Seattle, WA (US)

( * ) Notice: Subject to any disclaimer, the term of this patent is extended or adjusted under 35 U.S.C. 154(b) by 3 days.

(21) Appl. No.: 10/235,992

(22) Filed: Sep. 4, 2002

(51) Int. Cl.[7] ............................................. B65D 51/18
(52) U.S. Cl. ............................. 220/254.9; 220/592.17; 220/715
(58) Field of Search ................................. 220/711, 714, 220/715, 592.17, 592.2, 254.9, 254.1, 348; 222/545, 546

(56) References Cited

U.S. PATENT DOCUMENTS

| | | |
|---|---|---|
| 2,024,065 A | 12/1935 | Schellens |
| 3,147,770 A | 9/1964 | Perlis |
| 3,220,695 A | 11/1965 | Downey et al. |
| 3,863,798 A | 2/1975 | Kurihara et al. |
| 4,057,167 A * | 11/1977 | Lee ........................... 220/715 |
| 4,262,879 A | 4/1981 | Gönner |
| 4,960,218 A | 10/1990 | Toida et al. |
| D338,367 S | 8/1993 | Fonville |
| 5,392,967 A | 2/1995 | Satomi et al. |
| 5,427,271 A * | 6/1995 | Wang ........................... 220/715 |
| D362,156 S | 9/1995 | Goto et al. |
| 5,495,966 A | 3/1996 | Won |
| D381,558 S | 7/1997 | Schaefer et al. |
| D389,375 S | 1/1998 | Benson |
| D398,815 S | 9/1998 | Hatsumoto et al. |
| D406,011 S | 2/1999 | Hatsumoto et al. |
| D409,446 S | 5/1999 | St. John et al. |
| 5,918,761 A | 7/1999 | Wissinger |
| D416,443 S | 11/1999 | Kilpatrick et al. |
| 6,010,029 A * | 1/2000 | Wang ........................... 220/714 |
| D420,254 S | 2/2000 | Park |
| D421,364 S | 3/2000 | Kristiansen et al. |
| D429,959 S | 8/2000 | Otake |
| 6,102,244 A | 8/2000 | Kuwano et al. |
| D431,159 S | 9/2000 | Otake |
| D444,675 S | 7/2001 | Kerman |
| D454,756 S | 3/2002 | Janky et al. |
| 6,351,901 B1 | 3/2002 | Amsel |

* cited by examiner

*Primary Examiner*—Jacob K. Ackun
(74) *Attorney, Agent, or Firm*—Christensen O'Connor Johnson Kindness PLLC

(57) ABSTRACT

An insulated beverage container (100) has a tumbler (110), a handle assembly (120) including a collar (122) attached to the top of the tumbler, and a valved lid assembly (200). The tumbler has multiple wall construction, wherein the inner two walls (114, 116) define an insulating volume (118) therebetween that may be partially evacuated. The valved lid assembly includes an upwardly biased valve (240), near the top of the lid assembly, that may be moved from a closed position wherein the valve abuts a valve seat (214) in the lid assembly, and an open position wherein the valve is spaced apart from the valve seat. A non-skid base (102) with integral, upwardly extending grip elements provides a grip to facilitate handling of the tumbler.

13 Claims, 6 Drawing Sheets

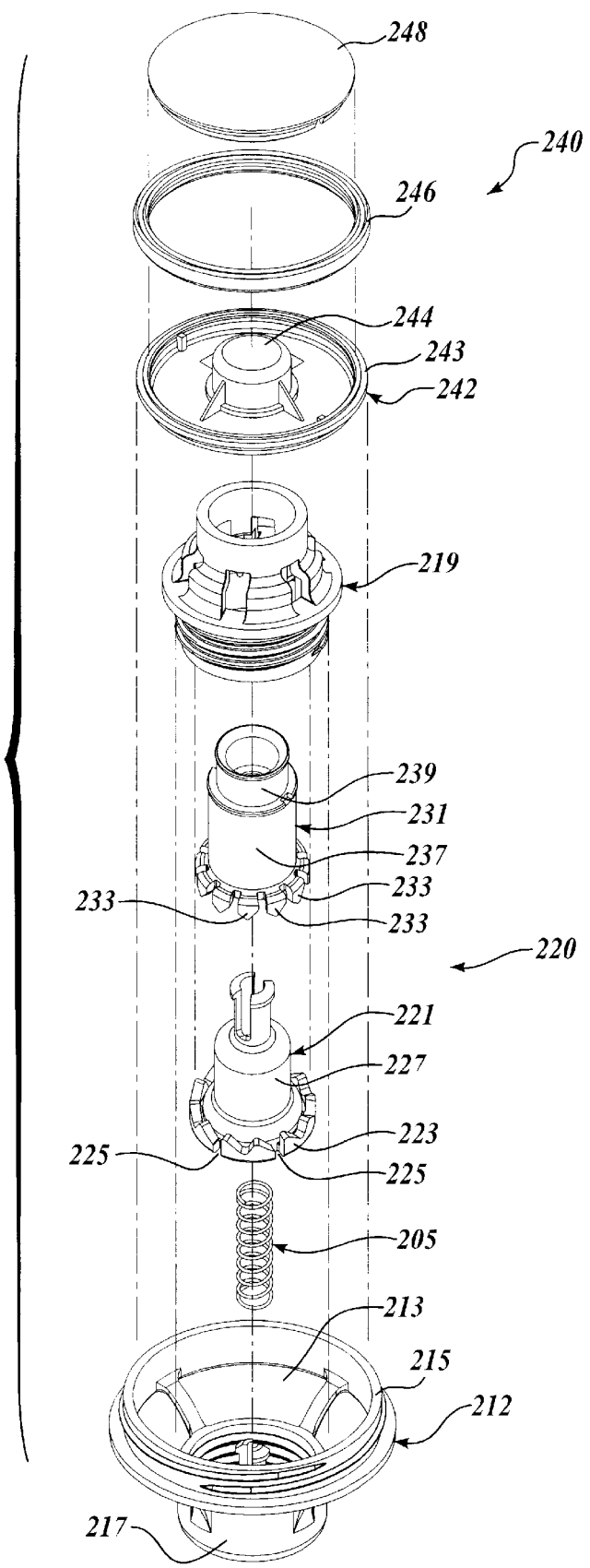

INSULATED BEVERAGE CONTAINER AND LID ASSEMBLY

FIELD OF THE INVENTION

The present invention relates generally to beverage containers and, more particularly, to insulated beverage containers with closable lids.

BACKGROUND OF THE INVENTION

Personal beverage containers, such as coffee tumblers, mugs, and the like, are used by beverage lovers everywhere. Although such personal beverage containers have traditionally been primarily for use at fixed locations, such as at home or at the office, more and more frequently, consumers are finding it desirable to have a beverage during transitions, for example, while traveling from home to work or during driving excursions. Specialty coffee stores serving premium coffees and other beverages—for example, those sold under the Starbucks® trademark—are finding widespread popularity.

Certain considerations are particularly relevant when the user intends to consume the beverage, at least partially, while traveling from one place to another. For example, it is typically desirable to maintain the temperature of the beverage, i.e., to keep hot beverages hot and/or cold beverages cold. Oftentimes the consumer will purchase the beverage at one location and travel to a second, possibly distant location, to consume the beverage. It is desirable that the beverage be maintained close to the preferred temperature for sufficient periods of time. Also, it is generally desirable to include a lid in order to reduce the likelihood of splash or spillage of the beverage during travel. Finally, particularly for reusable beverage containers, the container must be rugged enough to withstand the inevitable bump or fall.

Very often personal beverage containers are designed to be used once and then disposed of. Disposable cups with lids are well known in the art. Many consumers, however, prefer a beverage container that is sturdier than these disposable cups and that can be cleaned and reused. Another advantage of reusable beverage containers is that it reduces the burden on landfills and the like by reducing the use of disposable cups and lids. Reusable beverage containers are also known in the art and are frequently made from metal, glass, and/or plastic.

When a reusable beverage container is intended for use while traveling, it is usually provided with a lid that includes some mechanism that permits the user to consume the beverage without removing the lid. For example, the lid may simply include a small aperture, similar to the lid design on disposable beverage containers. In order to further reduce the likelihood of spillage, and to improve the insulating properties of the container, a mechanism such as a sliding plate or a removable stopper may be provided to close the small aperture when desired. However, such devices typically will still allow some spillage or leakage, for example, if the reusable beverage container is inverted. Although solid lids, i.e., lids that must be removed to access the contents of a container, can provide a very good seal, it is quite inconvenient to have to remove a lid that must then be carried separately. Moreover, a removable lid is subject to becoming separated from the reusable container and potentially lost. Therefore, it is useful to have a lid for a reusable beverage container that permits the user to access the contents of the container without removing the lid, wherein the lid is also capable of providing a good seal to hold the liquid in the reusable beverage container.

Valved lids for reusable beverage containers have been contemplated wherein the container lids are capable of providing a good seal. For example, U.S. Pat. No. 4,960,218 to Toida et al.; U.S. Pat. No. 5,392,967 to Satomi et al.; and U.S. Pat. No. 5,495,966 to Won all disclose various valved lids for bottle-type containers. These patents all describe devices that provide a convenient push-button mechanism for opening and closing the valve. In all of the disclosed devices, however, the valve itself is located at the very bottom of the lid assembly, and therefore even when the valve is in the closed position, a relatively deep channel remains, open at the top, in which fluids or other debris may accumulate. Moreover, it will be appreciated that this open channel is relatively inaccessible and difficult to see, so the user may not even be aware if undesired material accumulates therein. Also, if the valve is moved to the closed position while the bottle is tilted, some of the contained beverage may remain above the valve seat and not be visible to the user. This may result in undesirable spillage. Similarly, foreign debris may find its way into the open channel, and such foreign debris may be hidden from the user by the upper portion of the lid assembly.

Therefore, there remains a need for a valved lid for a reusable beverage container wherein the valve is disposed near the top of the valved lid, generally in plain view of the user.

SUMMARY OF THE INVENTION

A reusable beverage container having a valved lid assembly is disclosed wherein the valved lid assembly can be alternated between an open position and a closed position by simply depressing the valve. The valve is disposed near the top of the valved lid assembly and is visible so that the user can easily see if the valve is in the open or the closed position, and such that any fluid or debris above the valve is easily seen. The disclosed beverage container avoids the deep, open channel or cavity that is found in prior art valved lid assemblies.

The disclosed valve assembly for the lid comprises a lower body portion and an upper body portion that are releasably interconnected. The upper body portion includes a downwardly facing valve seat adapted to receive the valve, and the upper and lower body portions cooperatively provide a flow path through the valve when the valve is in the open position. An upwardly biased valve is provided below the valve seat, the valve having an upwardly disposed sealing surface that can be moved to engage the valve seat to close the flow path. A gear assembly is attached to the valve, below the valve, the gear assembly being operable to selectively move the valve between the closed position, upwardly biased against the valve seat, and an open position spaced apart from the valve seat.

In an embodiment of the invention, the valve includes an annular, elastomeric sealing element that sealingly engages the valve seat when the valve is in the closed position.

An embodiment of the invention further includes a tumbler having an insulating sidewall, a non-skid base portion at the bottom of the tumbler, and a collar fixedly attached to the top of the tumbler. The collar includes a groove that is adapted to receive corresponding projecting members on the valved lid assembly, such that the valved lid assembly can be removably secured to the collar and tumbler.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is an exploded view of the valve mechanism shown as a component of the reusable beverage container shown in FIG. 1;

FIG. 5A shows an exploded view of the gear elements; FIG. 5B shows the gear in the closed position; FIG. 5C shows the gear during transition; and FIG. 5D shows the gear in the open position;

DETAILED DESCRIPTION OF THE PREFERRED EMBODIMENT

Figure 1:
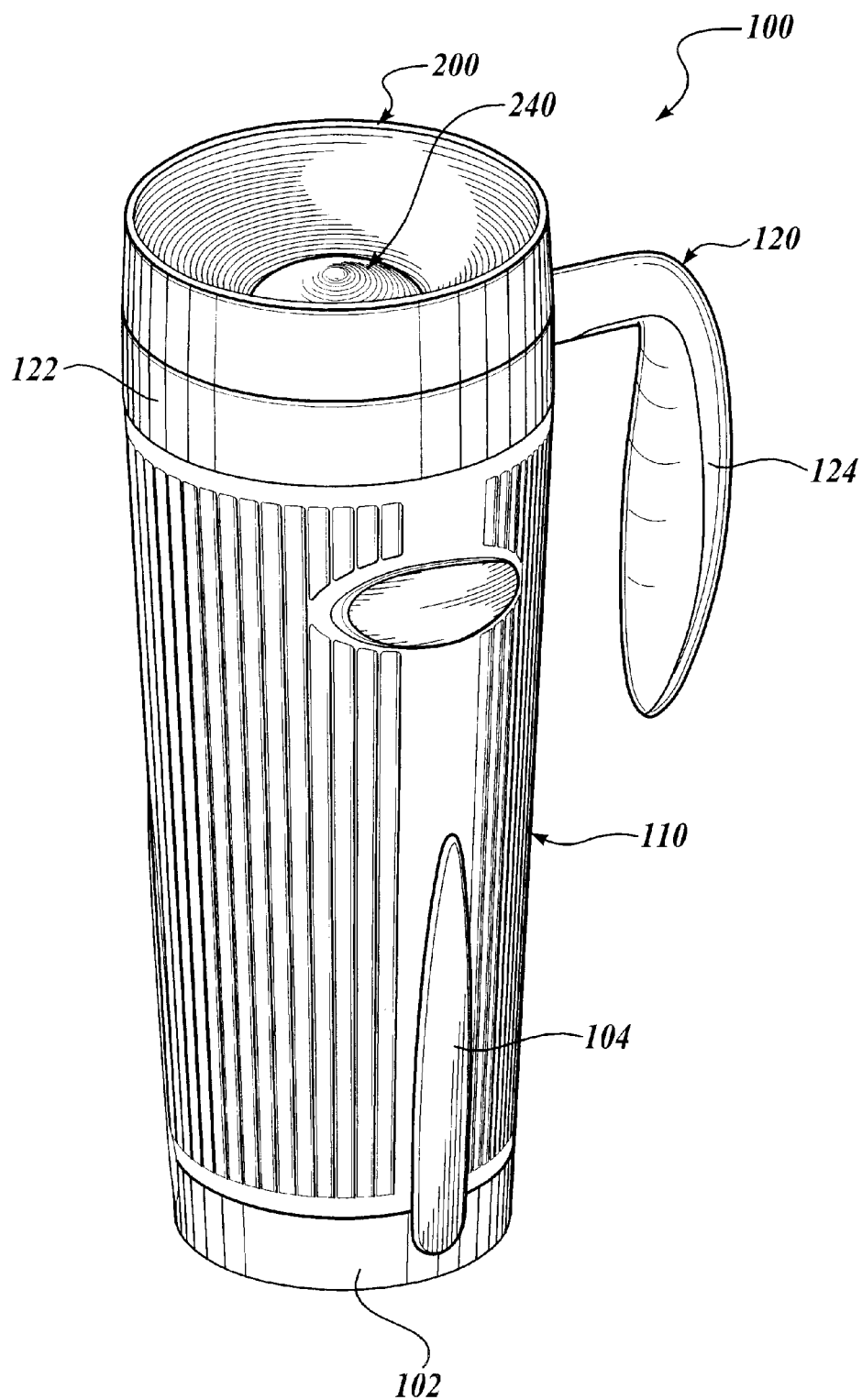
FIG. 1 is a perspective view of a reusable beverage container that is an illustrative embodiment of the present invention.
Figure 2:
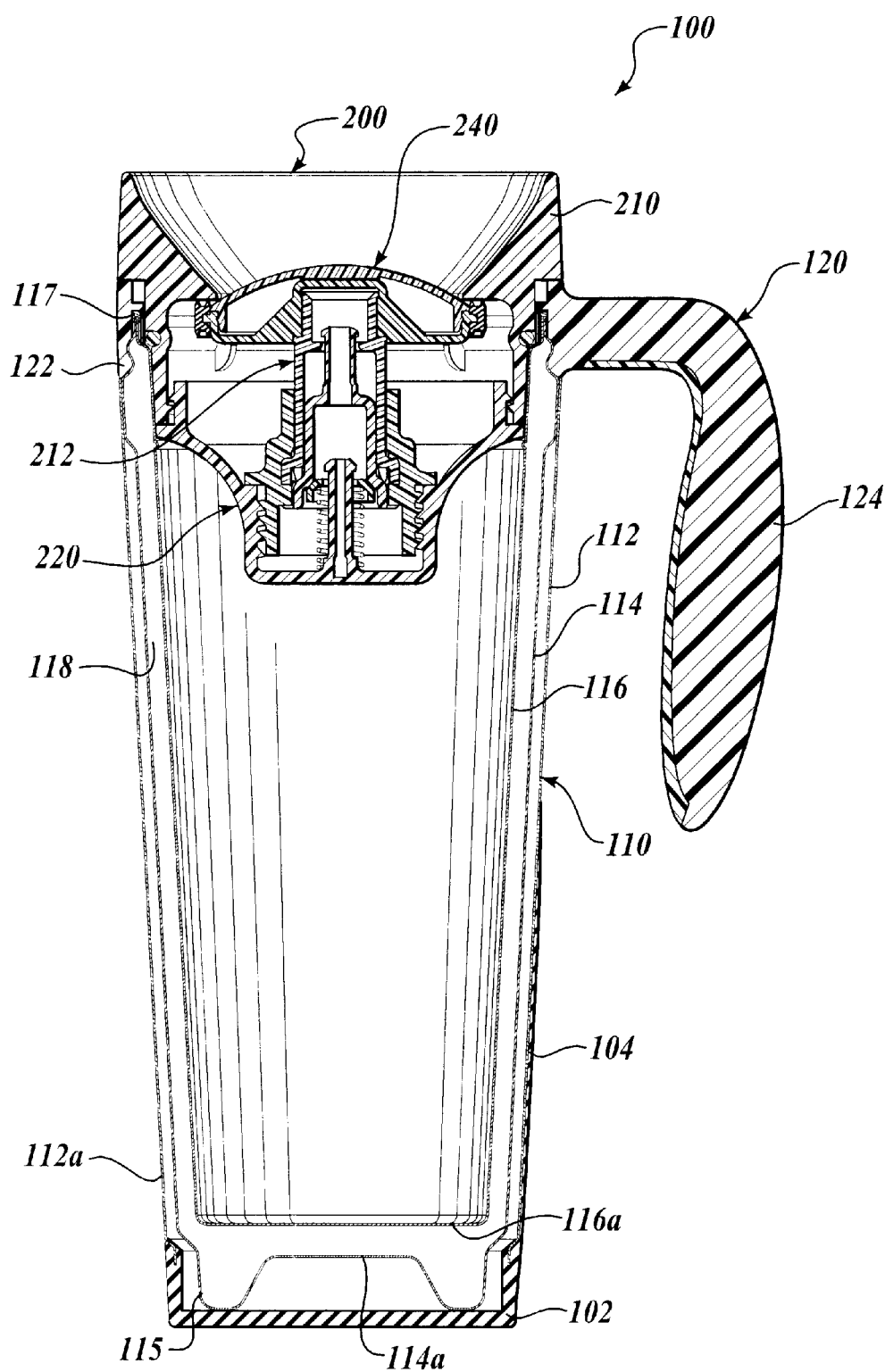
FIG. 2 is a cross-sectional view of the assembled reusable beverage container shown in FIG. 1.
Figure 3:
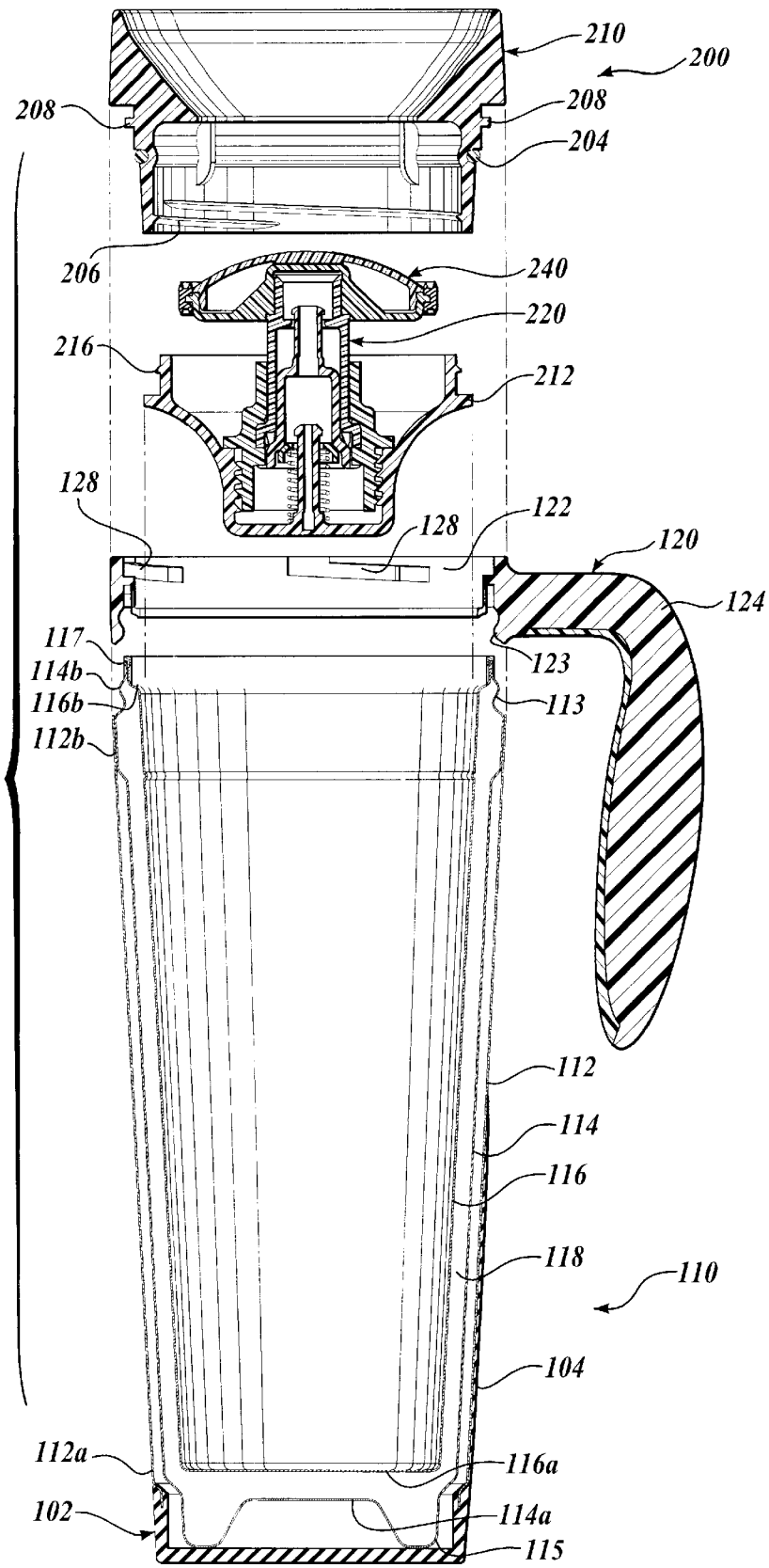
FIG. 3 is an exploded, cross-sectional view of the reusable beverage container shown in FIG. 1.

Referring now to the drawings, wherein like numbers reference like elements, a particular embodiment of the present invention will be described. FIG. 1 shows a perspective view of a reusable beverage container 100 having a valved lid assembly 200. FIG. 2 is cross-sectional view of the assembled beverage container 100, showing the details of the valved lid assembly 200. FIG. 3 shows an exploded cross-sectional view of the reusable beverage container 100. In this document the invention and the preferred embodiment disclosed herein will be described with reference to the orientation shown in the figures—that is, with the beverage container 100 in the upright position. Therefore, terms such as "upper," "lower," "upwardly," "downwardly," "top," "bottom," and the like shall refer to the apparatus in the upright position, although it is obviously intended that the beverage container 100 may be disposed in various orientations, and in particular that the user will rotate the beverage container 100 during use.

The reusable beverage container 100 includes a tumbler portion 110 defining a volume, open at the top, for holding a liquid, and includes a non-skid base 102. The non-skid base 102 preferably includes a plurality of upwardly-extending elongate fingers 104, that may be glued or otherwise affixed to the tumbler outer cup or wall 112, for example, in depressions in the outer wall 112. The elongate fingers 104 improve the gripping characteristics of the tumbler portion 110. A handle assembly 120, including an annular collar or rim 122 and an integral, generally L-shaped handle 124, is permanently attached at the upper end of the tumbler portion 110. Although a handle 124 is provided in the disclosed embodiment, it is also contemplated that the beverage container may be made without a handle, that is, utilizing a collar without an L-shaped handle. The valved lid assembly 200 engages the annular collar 122 to form a seal, whereby the interior of the tumbler portion 110 may be closed. As discussed below, the disclosed valved lid assembly 200 includes an upper body portion 210, a lower body portion 212, a gear assembly 220, and a disk-shaped valve 240 attached to the gear assembly 220. The valve 240 is movable between an open position, wherein the user can pour out the contents of the tumbler 110, and a closed position, wherein the interior of the tumbler 110 is generally sealed.

The tumbler portion 110 of the preferred embodiment is a three-wall construction including an outer cup 112 having an aesthetically pleasing appearance, a middle wall 114, and an inner cup 116, that define the interior wall of the tumbler 110. As shown in the figures, outer cup 112, middle wall 114, and inner cup 116 of the disclosed embodiment are concentrically nested, slightly tapered, generally cylindrical elements, although it will be obvious to persons of skill in the art that other shapes are possible. The middle wall 114 and inner cup 116 are closed at their bottom ends 114a and 116a, respectively. The middle wall bottom end 114a further includes an annular foot 115 extending generally downwardly to contact the base 102. The middle wall upper end 114b and inner cup upper end 116b are joined along a sealed end 117, such that the middle wall 114 and inner cup 116 define a sealed volume 118 therebetween. The sealed end 117 may be achieved, for example, by soldering, brazing, welding, epoxying, or co-forming the middle wall 114 and inner cup 116. It will now be appreciated by persons of skill in the art that the sealed volume 118 may be partially evacuated prior to sealing the volume 118, whereby the middle wall 114 and inner cup 116 cooperatively form an insulating wall for the tumbler 110. Evacuation of the sealed volume 118 may be accomplished in any number of ways as are well known in the art—for example, by attaching a tube (not shown) to the middle wall bottom end 114a to form a fluid couple to the volume 118, using a vacuum pump to partially evacuate the volume 118 and then sealing the tube while maintaining the partial vacuum.

The outer cup 112 of the preferred embodiment has a bottom end 112a that abuts or otherwise connects to the base 102. The top end 112b is attached to the middle wall 114 near the middle wall top end 114b. As seen most clearly in FIG. 3, the tumbler portion 110 includes a circumferential S-shaped profile 113 near the top that is adapted to receive a corresponding interior profile 123 in the collar 122 of the handle assembly 120, thereby mechanically locking the handle assembly 120 to the tumbler portion 110. It will be appreciated that the handle assembly 120 may be attached to the tumbler portion 110 by pressing the handle assembly 120 thereto, preferably with the tumbler portion 110 cooled and/or the handle assembly 120 heated to facilitate assembly.

In the preferred embodiment, the three walls 112, 114, and 116 are all metal, such as stainless steel, although it is contemplated that other materials may alternatively be used, including, for example, various plastics. Metal construction provides a rugged product that is generally able to withstand the occasional bumps and mishaps that may be expected, particularly for a transportable beverage container.

As seen most clearly in FIG. 3, the lower body portion 212 of the valved lid assembly 200 includes an outer threaded wall 216, that is adapted to threadably engage an inwardly threaded wall 206 of the upper body portion 210, such that the upper body portion 210 and lower body portion 212 can be interconnected or selectively disconnected—for example, to facilitate cleaning, repairing, or replacing components of the lid assembly 200. Also, the upper body portion 210 further includes outwardly disposed tabs 208 that are adapted to engage interior helical slots 128 in the collar 122, whereby the assembled valved lid assembly 200 can be releasably attached to the tumbler portion 110 through the handle assembly 120. An O-ring 204 is preferably provided on the upper body portion 210 to provide a good seal between the tumbler portion 110 and the valved lid assembly 200.

Referring now to FIG. 4 (an exploded view showing the lower body portion 212, gear assembly 220, and valve 240), the lower body portion 212 includes an externally threaded upper ring 215, and an internally threaded center portion 217 that is adapted to receive a screw-on extension 219. A plurality of large apertures 213 provides a flow path to permit the beverage (not shown) to flow through the assembly when the valve 240 is in the open position. The center portion 217 and extension 219 define an enclosure that substantially houses the gear assembly 220. Although the extension 219 of the disclosed embodiment screws on to the lower body portion 212, it is contemplated that the extension 219 may be alternatively connected to the lower body portion 212—for example, by gluing the pieces together after inserting the lower and upper gear members 221 and 231, respectively.

The lower gear member 221 includes a plurality of paired teeth elements 223 that are separated by vertical slots 225. The vertical slots 225 are sized to slidably receive vertical tabs 218 formed on the interior of the extension 219 (See FIGS. 6A–6B). A generally cylindrical portion 227 extends upwardly from the teeth elements 223. The upper gear member 231 includes a tubular portion 237 that is adapted to slidably engage the cylindrical portion 227 of the lower gear member 221. The bottom of the upper gear member 231 includes a plurality of generally pointed teeth 233 that are adapted to engage the teeth elements 223 of the lower gear member 221. A connecting tube 239 is provided at the top of the upper gear member 231, that is adapted to attach to the valve 240.

The valve 240 of the disclosed embodiment is generally disc-shaped, and comprises a lower button portion 242 having a peripheral edge 243 that is adapted to receive an annular elastomeric seal 246. A hollow center post 244 extends upwardly from the lower button portion 242, the post defining an aperture on the bottom side (not shown) for receiving the connecting tube 239 of the upper gear member 231, and a post on the upper side for attachment of an upper button portion 248. In the disclosed embodiment, the upper gear member 231 connects to the lower button portion 242 with a friction or interference fit, and the upper button portion 248 similarly connects to the lower button portion 242 with a friction fit. However, it will be apparent to one of skill in the art that these elements may be interconnected with any number of alternative connecting elements, such as with glue or separate connecting hardware. Alternatively, two or more of these components may be unitarily formed.

A compression spring 205 is provided in an axial location in the center portion 217 of the lower body portion 212, and below the lower gear member 221, such that the lower gear member 221 is biased upwardly toward the upper gear member 231. This upward bias is therefore promulgated through the upper gear member 231 to the valve 240. It will be appreciated from FIG. 4, that the upward motion of the lower and upper gear members 221, 231 is restricted by the tapered upper end of the extension 219.

Figure 5A:
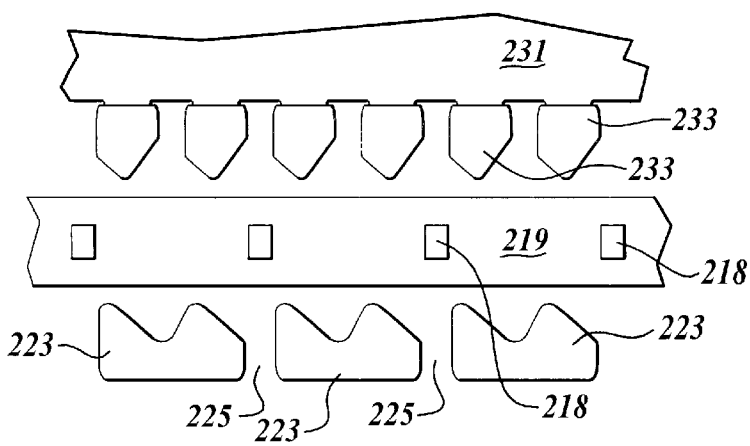
FIGS. 5A–5D are simplified developed elevation diagrams illustrating the gear assembly of the valve component of the reusable beverage container shown in FIG. 1.

The operation of the gear assembly 220 will now be described with reference to FIGS. 5A–5D and FIGS. 6A–6B. FIGS. 5A–5D show a fragmentary developed view of the gear train elements of the gear assembly 220. The pointed teeth 233 of the upper gear member 231 and the paired teeth elements 223 of the lower gear member 221, are disposed generally in the extension 219 (only a horizontal strip of the extension 219 is shown in FIGS. 5A–5D). FIG. 5A shows an exploded view of these gear elements in a developed planar view.

Figure 5B:
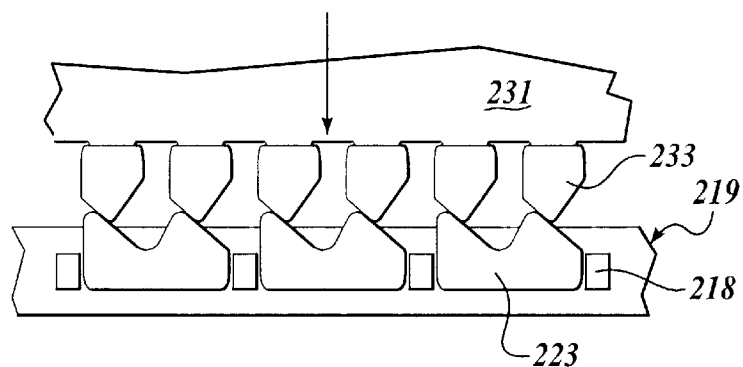
Figure 5C:
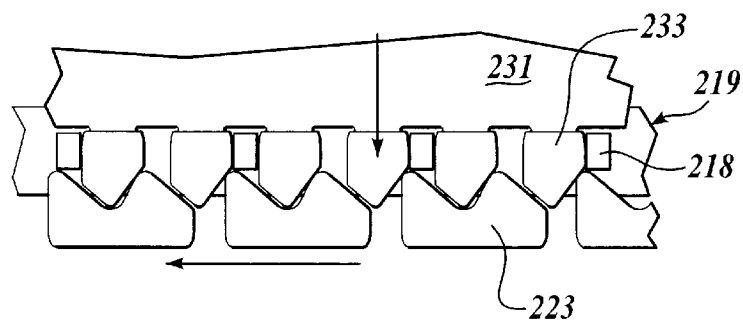
Figure 5D:
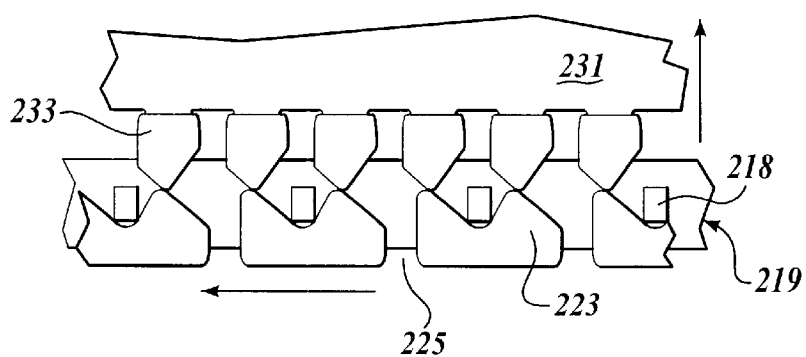

As discussed above, the extension 219 includes a plurality of tabs 218 that are sized and spaced apart to slidably accommodate the vertical slots 225 on the lower gear member 221. The position of these gear elements 223, 233, and 218 when the valve is in the upper or closed position (See FIG. 6B) is shown in FIG. 5B. In the closed position, the teeth elements 223 are aligned with the extension tabs 218, such that the teeth elements 223 of the upwardly biased lower gear member 221 are positioned between the tabs 218. When the user presses the top of the valve 240 (See FIG. 2), the pointed teeth 233 of the upper gear member 231 transmit that force to the teeth elements 223 of the lower gear member 221, as indicated by the downward arrow in FIG. 5B, against the biasing force of the compression spring 205 (not shown in FIG. 5). The teeth elements 223 are initially constrained by the tabs 218 on the extension 219 to move vertically in response to the downward force. The pointed teeth 233 will cause a sideways (or circumferential) force on the lower gear member 221, however, due to the slopes face of the teeth elements 223, such that when the lower gear member 221 has moved sufficiently to clear the tabs 218 the lower gear member 221 will rotate a fixed amount (i.e., move to the left in the developed drawing in FIG. 5B), as indicated by the horizontal arrow in FIG. 5C.

When the user then releases the pressure on the valve 240, the upward bias provided by the compression spring 205 will move the gear members 221, 231 upwardly, as indicated by the vertical arrow in FIGURE SD, and the tabs 218 acting against the sloped face of the teeth elements 223 will cause the lower gear member 221 to rotate a further fixed amount. Due to the rotation of the lower gear member 221, the teeth elements 223 are no longer aligned with the tabs 218, and the tabs 218 therefore blockingly engage the teeth elements 223, restricting the lower gear member from returning to the closed position, leaving the valve 240 in the open position as shown in FIG. 6A.

Figure 6A:
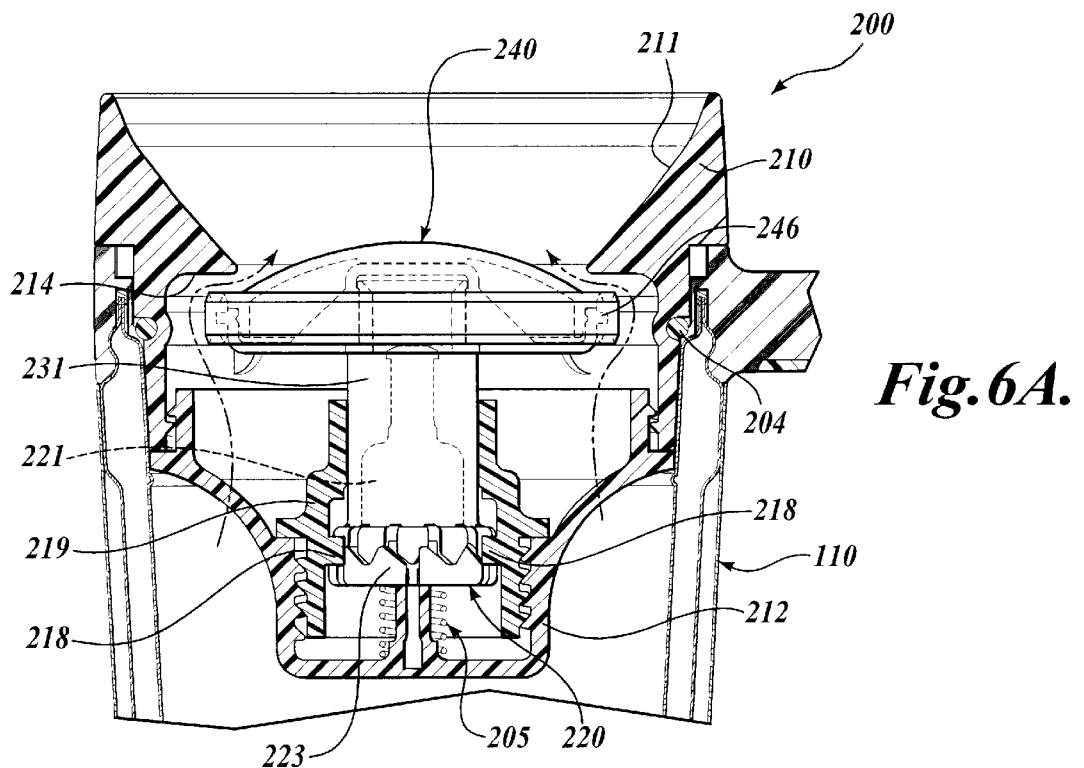
FIG. 6A is a cross-sectional view of the tumbler component of the reusable beverage container shown in FIG. 1, shown in the open position.
Figure 6B:
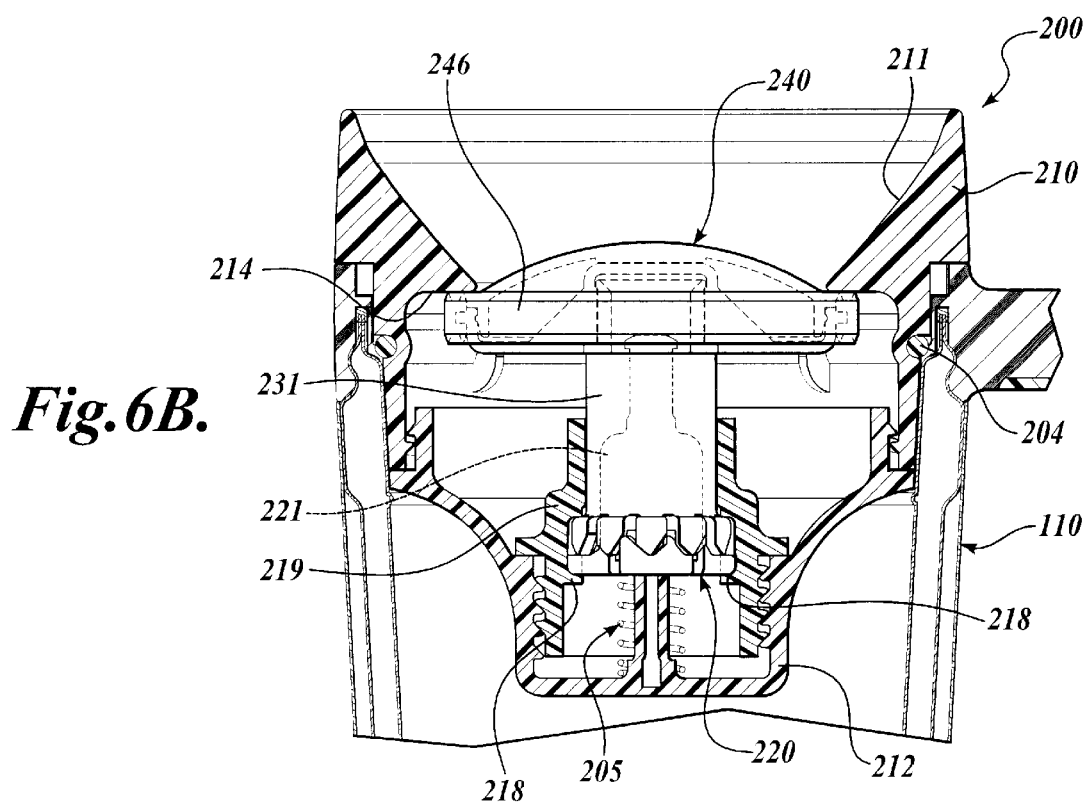
FIG. 6B is a cross-sectional view of the tumbler component of the reusable beverage container shown in FIG. 1, shown in the closed position.

It will be apparent from FIGS. 5A–5D and the description above, that depressing the valve 240 again will generally repeat the process, wherein depressing the valve 240 will cause the lower gear element 221 to rotate again, realigning the teeth elements 223 with the tabs 218, such that when the valve 240 is released, it will return to the closed position shown in FIG. 5B and FIG. 6B.

Referring now to FIGS. 6A–6B, in the disclosed embodiment the upper body portion 210 of the valved lid assembly 200 has a generally cup-shaped annular upper surface 211. The underside of the upper body portion 210 defines an annular, downwardly facing sealing surface or valve seat 214. When the valve 240 is in the open position, as shown in FIG. 6A, the valve 240, and in particular, the elastomeric seal 246, is disposed away from the valve seat 214. The gear assembly 220 is held in this open position by the vertical tabs 218 on the extension 219, as described above. The upper body portion 210 and lower body portion 212 therefore provide a flow path whereby the fluid in the tumbler portion 110 can flow out of the tumbler portion 110 through the valved lid assembly 200, as indicated by the dashed arrows in FIG. 6A. It will be appreciated that the fluid will flow out upon tilting or overturning the tumbler 110.

By depressing the valve 240 sufficiently to engage the gear assembly 220, the lower gear member 221 rotates to align the paired teeth elements 223 with the tabs 218. The compression spring 205 will then bias the valve 240 to the closed position shown in FIG. 6B wherein the valve 240 and, in particular, the elastomeric seal 246 abuts and sealingly engages the valve seat 214 of the upper body portion 210. This seal prevents the fluid contained in the tumbler portion 110 from flowing out of the container, even if the tumbler portion 110 is inverted.

It will now be appreciated that, in use, the user typically removes the valved lid assembly 200 from the tumbler portion 110 to fill the beverage container 100 with the desired fluid. The valved lid assembly 200 is then attached to the collar 122 by screwing the outwardly disposed tabs 208 into the helical slots 128 in the collar 122. To drink or pour the fluid from the beverage container, the user simply depresses the valve 240 against the biasing force of the compression spring 205, locking the valve 240 in the open position, spaced apart from the valve seat 214. To close the valve 240, the user again depresses the valve 240, whereby the spring 205 returns the valve 240 to the closed position, sealing the valved lid assembly 200. It will now be appreciated that the present invention provides a valve 240 that is disposed generally at the top of the valved lid assembly 240, the upper portion of which is visible to the user. The triple-wall construction of the disclosed embodiment, with the inner two walls providing an evacuated volume therebetween, provides good insulation of the beverage contained in the container 100. A non-skid base 102 with integral grip fingers 104 extending upwardly and attached to the outer wall 112 of the tumbler portion 110 provides a comfortable gripping surface for the user. An optional handle 124 integral with the collar 122 provides additional gripping options.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A valve assembly for a beverage container, the valve assembly comprising:
   a lower body;
   an upper body attached to the lower body, the upper body including a downwardly-facing valve seat, wherein the upper body and the lower body cooperatively define a fluid channel;
   an upwardly-biased valve member disposed below the valve seat, the valve member having an upwardly disposed sealing surface adapted to engage the valve seat such that the valve member blocks the fluid channel; and
   a gear assembly disposed below the valve member and attached to the valve member, the gear assembly having a closed position wherein the upwardly-biased valve member engages the valve seat, and an open position wherein the upwardly-biased valve member is disposed away from the valve seat.

2. The valve assembly of claim 1, wherein the valve member comprises a generally disc-shaped body portion having a peripheral edge, and an elastomeric sealing ring attached to the peripheral edge such that the sealing ring engages the valve seat when the gear assembly is in the closed position.

3. The valve assembly of claim 2, wherein the valve member further comprises an upper button portion and further wherein the gear assembly is adapted to alternate between the open and closed position by depressing downwardly on the upper button portion.

4. The valve assembly of claim 1, wherein the lower body further comprises a cylindrical center channel, and wherein the gear assembly is disposed in the center channel.

5. The valve assembly of claim 4, wherein the upper body further comprises a generally cup-shaped upper surface.

6. The valve assembly of claim 1, further comprising a means for sealingly attaching the valve assembly to a beverage container.

7. The valve assembly of claim 1, wherein the upper body is releasably attached to the lower body such that the upper body and lower body can be disassembled to facilitate cleaning the valve assembly.

8. A beverage container comprising:
   a tumbler having a lower end and an upper end;
   an annular collar attached to the upper end of the tumbler; and
   a valve assembly releasably attachable to the collar, the valve assembly comprising:
   (i) a lower body,
   (ii) an upper body attached to the lower body, the upper body including a downwardly-facing valve seat, wherein the upper body and the lower body cooperatively define a fluid channel,
   (iii) an upwardly-biased valve member disposed below the valve seat, the valve member having an upwardly disposed sealing surface adapted to engage the valve seat such that the valve member blocks the fluid channel, and
   (iv) a gear assembly disposed below the valve member and attached to the valve member, the gear assembly having a closed position wherein the upwardly-biased valve member engages the valve seat, and an open position wherein the upwardly-biased valve member is disposed away from the valve seat.

9. The beverage container of claim 8, wherein the annular collar further comprises a generally L-shaped handle portion.

10. The beverage container of claim 8, wherein the tumbler comprises a first wall portion and an inner cup portion nested generally within the first wall portion and wherein the first wall portion and inner cup portion define a sealed insulating volume therebetween.

11. The beverage container of claim 10, wherein the tumbler further comprises an outer wall portion disposed generally around the first wall portion.

12. The beverage container of claim 11, wherein the tumbler further comprises a non-skid base attached at the lower end of the tumbler.

13. The beverage container of claim 12, wherein the non-skid base further comprises a plurality of elongate, upwardly extending grip elements that are attached to the outer wall of the tumbler to facilitate gripping the beverage container.

* * * * *